United States Patent [19]
Giannuzzi et al.

[11] Patent Number: 5,593,261
[45] Date of Patent: Jan. 14, 1997

[54] FAIL-SAFE ANCHOR BOLT ASSEMBLY FOR CRACKED MASONRY

[76] Inventors: Anthony C. Giannuzzi; Louis N. Giannuzzi, both of 59 Dingletown Rd., Greenwich, Conn. 06830

[21] Appl. No.: 391,777

[22] Filed: Feb. 21, 1995

[51] Int. Cl.$^6$ ............................ F16B 13/04; F16B 13/06
[52] U.S. Cl. ........................ 411/55; 411/32; 411/60
[58] Field of Search ........................ 411/32, 33, 55, 411/57, 60, 61

[56] References Cited

U.S. PATENT DOCUMENTS

| | | | |
|---|---|---|---|
| 4,195,547 | 4/1980 | Giannuzzi | 411/55 |
| 4,537,541 | 8/1985 | Giannuzzi | 411/55 |
| 4,720,224 | 7/1988 | Peterken | 411/60 X |
| 4,854,793 | 8/1989 | Olivier et al. | 411/60 X |

*Primary Examiner*—Neill R. Wilson
*Attorney, Agent, or Firm*—Michael Ebert

[57] ABSTRACT

A fail-safe anchor bolt assembly installable in a pre-drilled hole in masonry to fasten a fixture or other object thereto, the assembly remaining securely anchored even should the hole later be enlarged as a result of a crack developed in the masonry. The assembly includes a bolt having a head engageable by a torque tool to turn the bolt and a shank extending from the head loosely encircled by an expansible shell whose normal outer diameter is close to that of the drilled hole. Threadably received on the rear end of the shank adjacent the shell is a conical frustrum-shaped wedge nut effectively divided into a leading zone and a trailing zone. The leading zone has a maximum diameter substantially equal to the normal outer diameter of the shell whereby in the course of installing the assembly as the bolt is turned to advance the leading zone of the nut into the shell, the shell is then expanded against the wall of the hole to produce an anchoring force. The trailing zone has a maximum diameter fractionally exceeding the predetermined diameter of the hole whereby should a crack later develop in the masonry resulting in enlargement of the drilled hole, the object loading the bolt then pulls the trailing zone of the wedge into the shell to effect further expansion thereof to maintain the anchoring force.

12 Claims, 2 Drawing Sheets

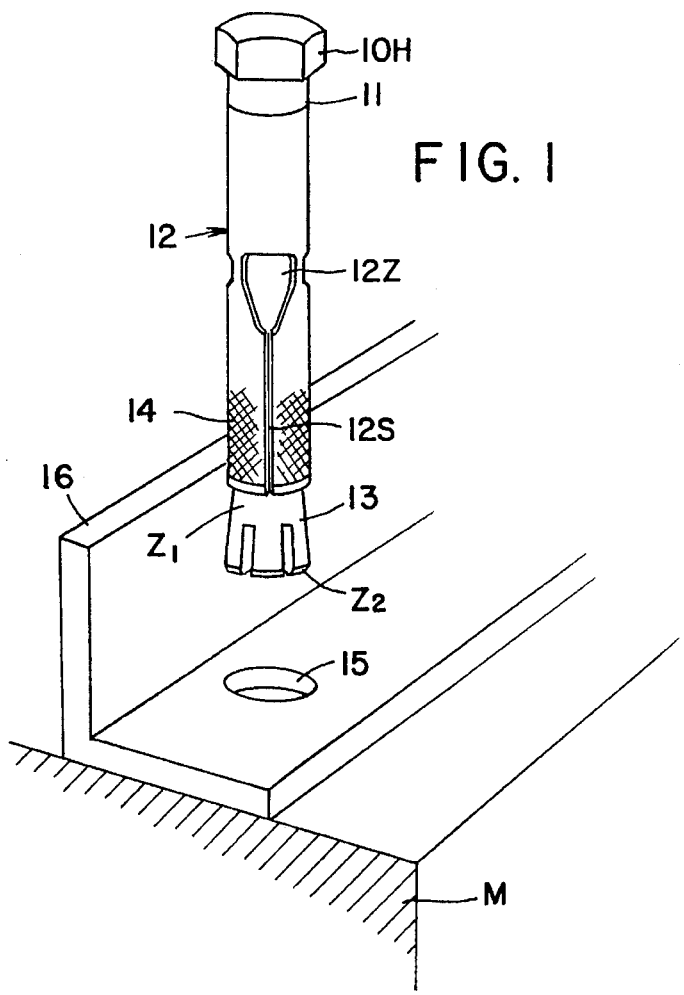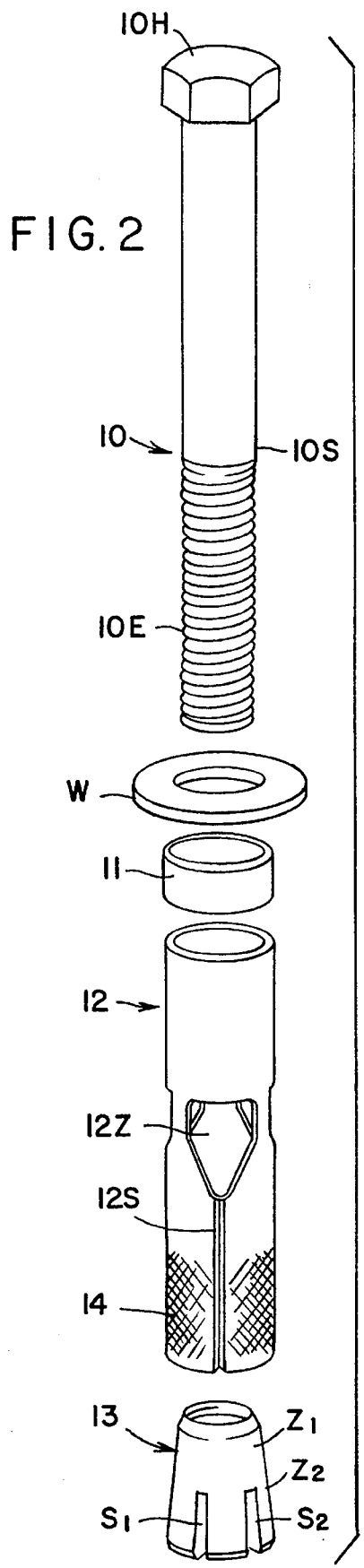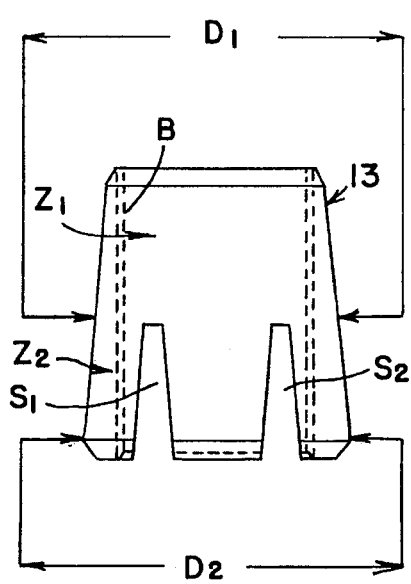

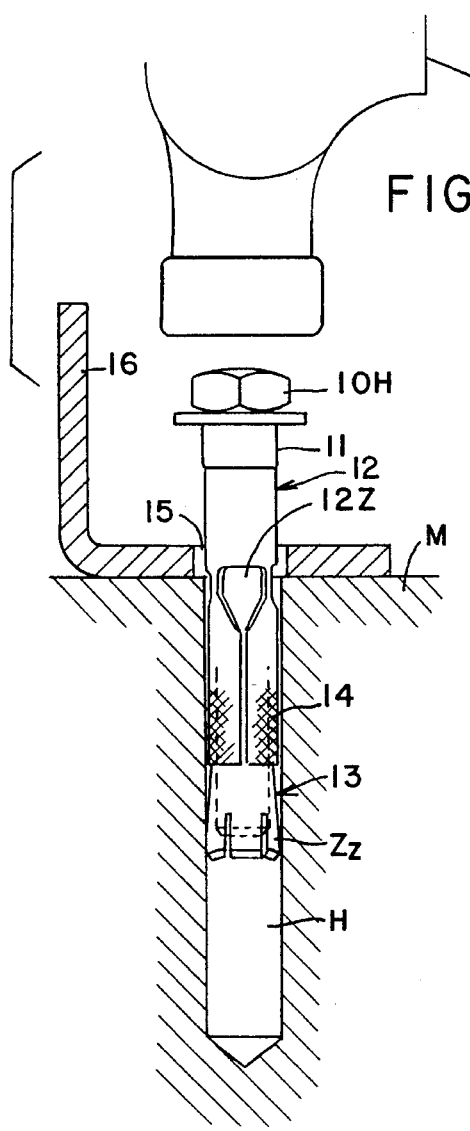
FIG. 4
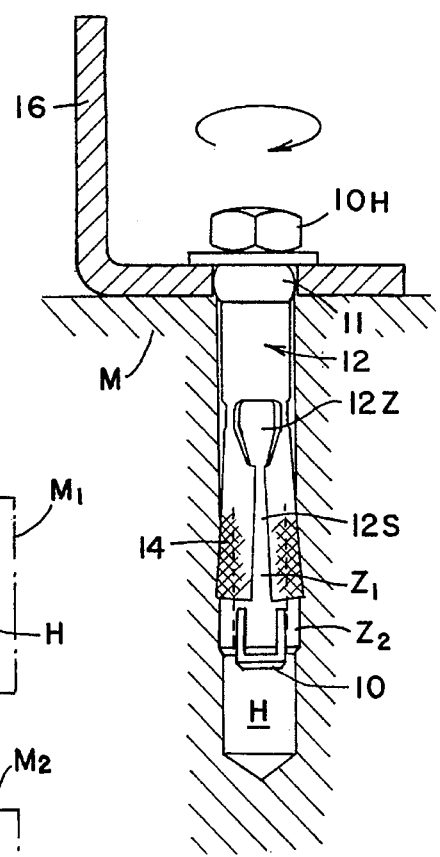
FIG. 5
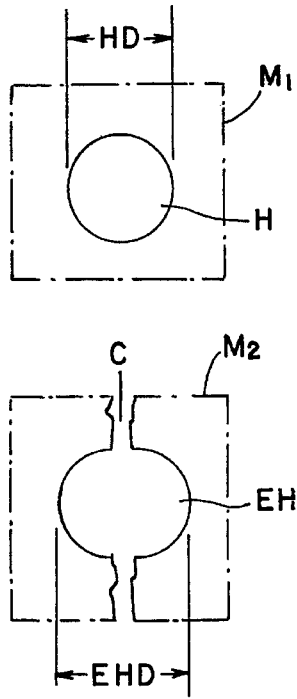
FIG. 6
FIG. 7
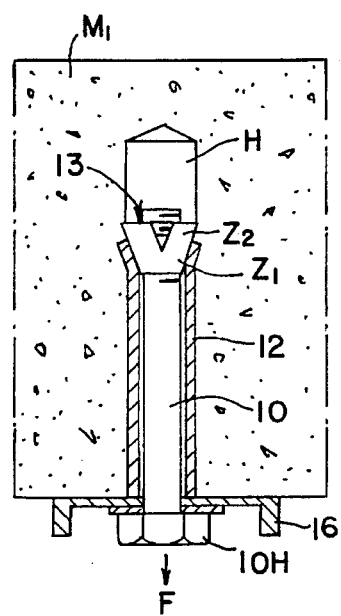
FIG. 8
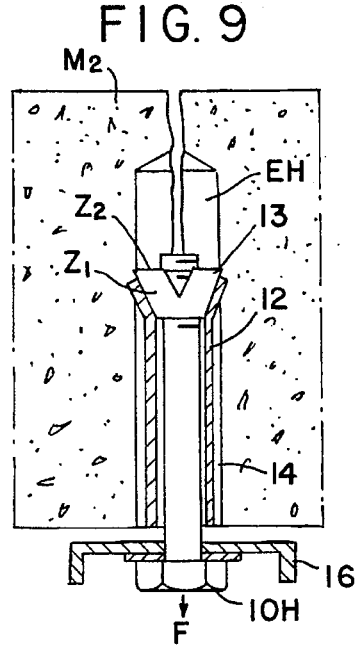
FIG. 9

FAIL-SAFE ANCHOR BOLT ASSEMBLY FOR CRACKED MASONRY

BACKGROUND OF INVENTION

1. Field of Invention

This invention relates generally to anchor bolt assemblies adapted to fasten fixtures and other objects to masonry, and more particularly to a fail-safe anchor bolt assembly which when installed in a pre-drilled hole in masonry will remain anchored therein even when a crack later develops in the masonry to enlarge the hole.

2. Status of Prior Art

It is often necessary to fasten fixtures and other heavy objects to the surface of brickwork, concrete and other forms of masonry. For this purpose, a conventional practice is to make use of an anchor bolt assembly having an expansible shell which serves to securely retain the bolt within the masonry hole. Anchor bolt assemblies come in diverse forms, but in all such assemblies, some means are provided to bring about the expansion of an expansible shell or a similar component against the wall of the masonry hole to anchor the assembly therein.

Thus in the Giannuzzi U.S. Pat. No. 3,766,819, a bolt whose threaded front end protrudes out of the masonry hole has a waist of reduced diameter adjacent its rear end, the waist being encircled by an expansible shell. The rear end of the bolt has a conical formation such that when during a fastening operation the bolt is slowly withdrawn from the hole by a nut turning on its threaded front end, the rear end cone of the bolt is axially advanced toward and into the shell to expand the shell against the wall of the hole, thereby anchoring the bolt in the masonry.

The primary concern of the present invention is with anchor bolt assemblies of the type disclosed in the Dempsey U.S. Pat. No. 2,988,950 in which a wedge nut is received on the threaded rear end of a headed bolt. When the bolt is turned by a wrench engaging the head, this nut is caused to travel upwardly on the bolt to enter and expand an expansible shell, forcing this shell into tight engagement with the wall of the hole in which the bolt is inserted. One deficiency of bolt anchors of this known type is that under severe vibratory conditions, the bolt may be loosened from the nut, thereby weakening the anchor.

The prior Giannuzzi U.S. Pat. No. 4,195,547 discloses a vibration-proof anchor bolt assembly which is insertable in a hole drilled in masonry for fastening a fixture or other object to the surface thereof, the diameter of the hole being slightly larger than that of the bolt. The bolt is provided with an enlarged head that lies against the fixture and is engageable by a torque tool, the threaded rear section of the bolt being of reduced diameter. The upper portion of the rear section is encircled by an expansible shell which when expanded is forced against the wall of the hole to anchor the bolt therein. Received on the lower portion of the rear section is a wedge nut having an upper conical zone, and a lower cylindrical ring zone whose normal diameter is larger than that of the hole, slots being cut into said ring zone to define spring fingers. These fingers are inwardly flexed by the wall of the hole when the assembly is inserted therein, thereby compressing the ring and constricting the internally-threaded bore thereof.

When the Giannuzzi '547 bolt assembly is fully inserted in the hole and the bolt head is turned by the tool, the wedge nut, whose rotation is arrested by the compressed ring, is axially advanced toward the shell, the conical upper zone of the nut entering the space between the shell and the threaded rear section of the bolt and acting progressively to expand the shell against the wall of the hole until a point is reached where the threaded end of the rear section enters the constricted bore of the compressed ring. The resultant advance of the wedge nut wedges the threaded portion of the bolt between the compressed spring fingers, forcing these fingers outwardly against the hole of the wall, to create pressure between the mating threads which prevents loosening of the bolt under vibratory conditions.

When an expansion-type anchor bolt assembly of the prior art type disclosed above is installed in overhead or side wall masonry, the object fastened to the masonry imposes a load on the anchor bolt which seeks to pull it out of the hole drilled in the masonry. It is vital therefore that in such installations the anchor remain effective under anticipated load conditions. Should the anchor fail and the object become unfastened from the masonry wall, this could endanger human life or have serious economic consequences.

The holding power of an expansion-type masonry anchor of a given size is determined on the basis of a pre-drilled hole of a specified diameter, for when the expansible shell of this anchor is expanded against the wall of the hole by a wedge nut, it is the magnitude of the anchoring force applied by the shell to the wall that is a measure of the holding power of the anchor.

The available holding power depends on the maximum diameter of the wedge nut and the thickness of the shell expanded by the wedge nut. If therefore the outer diameter of the shell is about equal to the diameter of the drilled hole and the maximum diameter of the wedge nut is equal to the outer diameter of the shell, then it is the thickness of the shell that determines the degree to which the outer diameter of the shell can be expanded.

The holding power of an expansion-type anchor is calculated on the basis of a pre-drilled hole in masonry of a specified diameter, it is being assumed that this diameter has a fixed dimension. However, under actual conditions masonry cannot be trusted to remain free of cracks that alter the dimensions of a hole drilled therein. It is known that in concrete, after an anchor is installed therein, that cracks may form in the concrete as a result of vibration and other forces to which the concrete is subjected. The formation of these cracks is exacerbated by the lateral forces produced by an expanded anchor installed in a hole drilled in the concrete.

Should a crack in masonry slice through the wall of a hole drilled therein, the hole wall is then divided into separated sections which effectively enlarge the hole. If the cracked hole has an expansion anchor installed therein whose shell is expanded against the wall of the hole, the force of the expanded shell seeks to widen the separation therebetween, thereby further enlarging the drilled hole and loosening the installation. When a hole is enlarged by a masonry crack, the holding force applied by the expanded shell of the anchor to the wall of the hole is weakened, and the bearing load on the bolt of the anchor produced by the object fastened to the concrete may be great enough to pull the anchor entirely out of the enlarged hole.

Many building officials in the United States and Europe are now concerned that masonry anchors installed in pre-drilled holes be capable of supporting the anticipated load even when a crack develops in the masonry. As indicated by the UEAtc "Technical Guide on Anchors for Use in Cracked and Non-Cracked Concrete" (June 1992) published by the British Board of Agrement, one answer to the problem created by this requirement is to provide undercut anchors which are anchored mainly by a mechanical interlock provided by an undercut in the concrete.

Undercutting is achieved after drilling the cylindrical hole in the masonry by using a special drill before installing the anchor. This undercutting procedure is a time consuming and costly operation, particularly when hundreds of anchors have to be installed at a given site. Moreover anchors of the type adapted for installation in such undercut masonry are more expensive than masonry anchors designed for installation in drilled cylindrical holes.

The need exists therefore for an inexpensive anchor bolt assembly for masonry that is quickly installable in a pre-drilled cylindrical hole and is capable of maintaining an object fastened to masonry even when as result of a crack in this masonry the hole is then enlarged.

SUMMARY OF INVENTION

In view of the foregoing, the main object of this invention is to provide a fail-safe anchor bolt assembly which when installed in a hole pre-drilled in concrete or other form of masonry to fasten a fixture or other object to the surface of the masonry, remains securely anchored in the masonry even should the hole later become enlarged as a result of a crack developed in the masonry.

More particularly, an object of this invention is to provide an anchor bolt assembly of the above type having an expansible sleeve which is initially expanded against the wall of the pre-drilled hole to produce a strong anchoring force, and should the hole later become enlarged as a result of a crack in the masonry, is then further expanded against the wall of the enlarged hole to maintain the anchoring force.

A significant advantage of a fail-safe anchor bolt assembly in accordance with the invention is that it affords long term security and takes into account the possibility that the masonry in which the anchor is installed may crack at some future time, the assembly then compensating automatically for an enlargement in the hole in the masonry resulting from the crack to maintain the anchoring force.

Yet another object of the invention is to provide an anchor bolt assembly suitable for installation in masonry subject to cracking which is no more expensive to make than a conventional assembly of the expansion type.

Briefly stated, these objects are obtained by a fail-safe anchor bolt assembly installable in a pre-drilled hole in masonry to fasten a fixture or other object thereto, the assembly remaining anchored in the masonry even should the hole later be enlarged as a result of a crack developed in the masonry. The assembly includes a bolt having a head engageable by a torque tool to turn the bolt and a shank extending from the head loosely encircled by an expandable shell whose normal outer diameter is close to that of the drilled hole. Threadably received on the rear end of the shank which projects beyond the shell is a frustrum-shaped wedge nut that is effectively divided into a leading zone and a trailing zone. The leading zone which is dimensioned to enter the shell when the bolt is turned has a maximum diameter approximating the normal outer diameter of the shell and the trailing zone has a maximum diameter exceeding that of the drilled hole, and is slotted to define spring fingers which render the trailing zone compressible so that it may be tapped into the hole.

When the assembly is inserted into the hole, the spring fingers are then compressed by the wall of the hole to prevent rotation of the nut. As the bolt is turned by the tool, the nut advances axially toward the shell and the leading zone enters therein to expand the shell against the wall of the hole to produce an anchoring force. Should a crack later develop in the masonry, giving rise to an enlarged hole, the resultant pull exerted on the bolt by the object loading the bolt will then advance the nut more deeply into the shell to cause the trailing zone of the nut to further expand the shell against the wall of the enlarged hole and thereby maintain the anchoring force.

BRIEF DESCRIPTION OF DRAWINGS

For a better understanding of the invention as well as other objects and further features thereof, reference is made to the following detailed description to be read in conjunction with the accompanying drawings, wherein:

FIG. 1 is a perspective view of one preferred embodiment of an anchor bolt assembly in accordance with the invention; the assembly being shown in conjunction with a fixture to be fastened to masonry;

FIG. 2 is an exploded view of the bolt assembly;

FIG. 3 is a separate view of the wedge nut of the assembly;

FIG. 4 illustrates the assembly being tapped into a hole drilled in masonry;

FIG. 5 shows the installed assembly;

FIG. 6 is a top view of a cylindrical hole drilled in uncracked concrete;

FIG. 7 shows the same hole after the concrete has cracked and widened the hole;

FIG. 8 schematically illustrates the anchor bolt assembly installed in uncracked concrete; and FIG. 9 schematically illustrates the same anchor after the concrete has cracked.

DETAILED DESCRIPTION OF INVENTION

Structure of Assembly:

Referring now to FIGS. 1, 2 and 3, there is shown one preferred embodiment of an anchor bolt assembly in accordance with the invention installable in a hole pre-drilled in masonry to fasten an object to the surface of the masonry. The assembly, all of whose load-bearing components are preferably fabricated of steel to satisfy fire code requirements, is constituted by a bolt 10, a deformable collar 11, an expansible shell 12 and a wedge nut 13. Deformable collar 11 is fabricated of a lead alloy or a plastic material such as nylon which undergoes deformation when subjected to compression. In FIG. 1 the assembly is shown positioned above the mounting hole 15 of a fixture 16 to be fastened to a masonry wall M.

Bolt 10 has an enlarged hexagonal head 10H engageable by a wrench or other torque-producing tool, and a shank 10S extending from the head having a threaded end section 10E of the same diameter. In practice, the assembly may include a metal washer W (omitted in FIG. 1), the washer lying under the head of the bolt to engage fixture 16 or whatever other object is to be fastened to the masonry.

Expansible shell 12 is loosely received on the shank above wedge nut 13, so that a small annular space exists between the shell and the shank. Shell 12 includes, at about its midpoint, three circumferentially arranged pear-shaped openings 12Z and three longitudinal slots 12S which extend from the lower end of the shell to these openings to create three bendable tines 14 whose outer surface is knurled to provide frictional engagement with the wall of the hole. The normal outer diameter of expansible shell 13 and of collar 11 is slightly smaller than the predetermined diameter of the hole H pre-drilled in the masonry into which the assembly is to be inserted. If, therefore, use is made of a nominal half-inch diameter carbide drill, the hole produced thereby will actually have a 0.530 inch diameter. In that case, the bolt assembly for a hole this size will have a sleeve and collar of ½ inch diameter, so as not to interfere with insertion into the hole.

The construction of the expansible shell is such that when wedge nut 13 which has a conical frustrum shape and is threadably received on the end section 10E of the bolt shank, is caused when the bolt is turned, to advance axially toward the shell, the leading zone of the nut then enters the small annular space between the shell and the shank. This action forces the bendable tines 14 of the sleeve outwardly against the wall of the masonry hole to produce an anchoring force that holds the assembly in the hole, thereby fastening the fixture or other object to the masonry.

The frustrum shape of the nut is geometrically that of a solid cone between two parallel planes cutting the solid. In practice, the core from which the frustrum is formed need not have a rectilinear taper but may have a curvilinear taper. As separately shown in FIG. 3, wedge nut 13 which is provided with an internally threaded bore B is effectively divided into a leading zone $Z_1$ whose front end is bevelled to facilitate entry of this zone into the annular space between sleeve 12 and the end section 10E of the shank, and a trailing zone $Z_2$ whose rear end is bevelled to facilitate entry of the nut into the drilled hole when the assembly is inserted therein.

The maximum diameter $D_1$ of the leading zone $Z_1$ approximates the normal outer diameter of sleeve 12, while the greater maximum diameter of the trailing zone $Z_2$ of the nut fractionally exceeds the diameter of the pre-drilled hole in the masonry. Hence to insert the assembly into a hole whose diameter is smaller than the maximum diameter of the trailing zone of the wedge nut, the trailing zone must be compressible to reduce its diameter so that the assembly can be tapped into the hole.

The trailing end zone $Z_2$ of the wedge nut is rendered compressible by a set of longitudinal slots $S_1$, $S_2$, etc., which define flexible spring fingers, whereby when the bolt assembly is tapped into the masonry hole, the fingers are then flexed inwardly to compress this zone to thereby create an outward tension applying pressure to the wall of the hole which resists rotation of the wedge nut. The slot configuration illustrated in figures is but one of several possible arrangements. Thus in practice one may cut six slots into the nut at 60° intervals therein.

Installation of Assembly:

Referring now to FIG. 4, there is shown the first step to be taken when fastening a fixture or other object to the surface of masonry M in which a hole H is to be drilled. We shall assume that the article to be fastened is in the form of fixture 16 having a mounting hole 15 therein which registers with the hole H in the masonry. In the first step, the bolt assembly is placed with the wedge nut thereof directly over the hole in the fixture in axial alignment with the hole in the masonry.

Since compressible trailing end zone $Z_2$ of wedge nut 13 has a maximum diameter somewhat larger than that of the hole drilled in the masonry, it is necessary to tap the assembly in with a hammer, to thereby compress trailing end zone $Z_2$ to permit insertion of the assembly into the masonry hole.

The assembly is tapped into hole H until it is fully inserted therein with head 10H of the bolt lying flush against bracket 16 (or against a washer carried by the bolt). At this point, as shown in FIG. 5, the head is engaged by a wrench or other torque-producing tool, and the bolt is turned. The trailing zone $Z_2$ on the wedge nut is compressed by the wall of the masonry hole thereby preventing rotation of the nut as the bolt is turned.

As the bolt continues to turn, wedge nut 13 advances axially toward expansible shell 12, and the leading zone $Z_1$ enters the annular space between the shell and the rear section 10E of the bolt shank encircled thereby. The leading end zone $Z_1$ as it advances, expands the shell and forces bendable tines 14 outwardly against the wall of the hole H to develop an anchoring force which determines the holding power of the anchor. It is to be noted that a heavy load imposed on the bolt by an object fastened to the masonry, which would seek to pull bolt 10 out of the hole, would at the same time serve to force the leading zone $Z_1$ of wedge nut 13 further into shell 12 and thereby enhance the anchoring power thereof. In this sense, the load serves to energize the anchor; the heavier the load, the greater the anchoring force.

It must be borne in mind that in some instances where, for example, the fixture is of wood and is slightly warped so that it does not lie flat against the masonry wall, it is not enough for the bolt head to lie flush against the fixture; for one must continue to turn the bolt until the head thereof presses the fixture tightly against the wall. Collar 11 permits this tightening action, for deformation of this collar allows bolt head 10 to advance forward until it presses fixture 16 tightly against the masonry wall.

It will be appreciated that when the same tool is used to turn the bolt in the reverse direction, this serves to unlock the bolt from the nut, and it becomes possible to remove the bolt from the hole without difficulty, leaving the collar, the expansion shell and the wedge nut behind.

However, at some future time, the fixture may be reinstalled merely by re-inserting and tightening the bolt. A second aspect of reusability is that the bolt may be reused in a new assembly by applying a fresh collar, shell and wedge nut thereto.

Fail-Safe Operation:

An anchor bolt assembly in accordance with the invention, when installed in a hole H pre-drilled in masonry $M_1$ having a diameter HD, as illustrated in FIG. 6, is securely anchored therein by the anchoring force produced by the shell expanded by the leading zone $Z_1$ of the wedge nut. FIGS. 6 and 8 illustrate a condition in which the masonry $M_1$ is uncracked; hence the diameter HD of hole H is determined by the diameter of the drill bit drilling the hole.

FIG. 7 illustrates a condition in which the masonry $M_2$ in which the hole is pre-drilled becomes subsequently cracked after the anchor bolt assembly has been installed therein. Should this crack slice through the hole, the crack C will divide the wall of the hole into two sections which are spaced apart to a degree determined by the nature of the crack, thereby effectively producing an enlarged hole EH of oblong cross-section which is wider than hole H in the uncracked masonry and has a diameter EHD.

When the hole is uncracked, the anchor bolt assembly as shown in FIG. 8 serves to fasten the fixture 16 or other object directly against the surface of masonry $M_1$, the fixture acting as a load producing a downward force F which seeks to pull the bolt assembly from the hole. Force F is resisted by the anchoring force of the bolt assembly on the wall of the hole.

But when as shown in FIG. 9, masonry $M_2$ develops a crack C which enlarges the hole, the anchoring force of the installed bolt assembly is weakened to an extent that depends of the size of the enlarged hole EH. The load force F imposed on the bolt 12 of the anchor assembly may then be sufficient to overcome the weakened anchor force, as a consequence of which force F proceeds to withdraw bolt 12 from enlarged hole EH, thereby causing fixture 16 to become displaced from the surface of masonry $M_2$.

Then bolt 12, on whose end wedge nut 13 is attached, proceeds to advance outwardly from the enlarged hole EH in the cracked masonry. This movement causes nut 13 to move more deeply into the expanded shell 12, the trailing zone $Z_2$ of the nut then penetrating the expanded shell to further expand it to frictionally engage the wall of the enlarged hole EH and thereby restore and maintain the anchoring force. The greater the extent to which a crack enlarges the hole, the more deeply into shell goes the trailing zone $Z_2$ to outwardly flare the tines 14 of the shell to engage the wall of the enlarged hole to maintain an anchoring force sufficient to prevent the anchor bolt assembly from being pulled out of the enlarged hole by the load imposed thereon. The leading and trailing zones $Z_1$ and $Z_2$ of the wedge nut form part of a common frustrum. Consequently there is an uninterrupted transition from the leading zone to the trailing zone when the wedge nut is pulled more deeply into the shell because the drilled hole has become enlarged.

Should a crack develop in the masonry in which the anchor bolt assembly is installed, the resultant enlarged hole in the masonry activates the assembly, for the load imposed on the bolt of the assembly then pulls the wedge nut more deeply in the shell to further expand if against the wall of the enlarged hole to thereby maintain the anchoring force.

While a crack in the masonry will cause the fixture or other anchored load to separate slightly from the surface of the masonry, the fixture will remain fastened to the masonry, for the anchoring force is maintained. And by again turning the bolt with a torque tool, one may then tighten the fixture against the surface of the masonry.

Thus an anchor bolt assembly in accordance with the invention is a fail-safe assembly, for it is capable of compensating automatically for an enlargement in the size of the hole in masonry in which the assembly is installed as a result of a crack later developed in the masonry.

The reason why a conventional expansion type anchor bolt assembly is incapable of affording a fail-safe operation is that its conical wedge nut must have a maximum diameter no greater than the diameter of the drilled hole, so that the nut is receivable therein. When the assembly is inserted in the drilled hole and the bolt is turned to advance the conical nut into the expansible sleeve, the sleeve is then expanded against the wall of the hole to anchor the assembly in the hole. But should a crack later develop in the masonry enlarging the hole and releasing the anchoring force, though the wedge nut will then be pulled by the load on the bolt deeper into the expansible shell, because its maximum diameter is no greater than that of the pre-drilled uncracked hole and is measureably smaller than the size of the enlarged cracked hole, the nut is incapable of further expanding the shell against the wall of the enlarged hole to provide a substantial anchoring force.

Load Displacement Curve:

The smooth, uninterrupted transition from the leading zone to the trailing zone of the wedge nut is due to its conical frustrum geometry in which the diameter of the nut increases progressively in a rectilinear or curvilinear path without any discontinuity. The geometry of the nut and its dimensions play a vital role in the operation of the anchor bolt assembly when the drilled hole in which the assembly is installed, is enlarged as a result of a crack in the masonry. When this crack develops, and weakens the anchoring force, the wedge nut mounted on the threaded end of the bolt is then pulled by the load imposed on the bolt more deeply into the expansible shell to further expand it against the wall of the enlarged hole to restore and maintain the anchoring force.

In this action which takes place only when a crack develops in the masonry, the load produced by the object fastened by the anchor bolt assembly against the surface of the masonry, is shifted from this masonry surface to an ultimate position spaced from this surface. The outward movement of the load from its surface position to the ultimate position, when graphically plotted, produces what is referred to in the VEAtc Technical Guide, above identified, as "the load displacement curve."

As noted in this Technical Guide, the criteria for load displacement includes a requirement that "the load displacement curve must show a steady increase." This dictates that the curve running from the position of zero displacement to the ultimate position of the load be a substantially straight line, free of undulation. The Technical Guide indicates that an increase in displacement which is unsteady, because of "an uncontrolled slip of the anchor" is not acceptable.

No uncontrolled slip is encountered with an anchor bolt assembly in accordance with the invention. When the drilled hole in which the assembly is installed is enlarged as a result of a crack developed in the masonry, the frustrum shaped wedge nut whose diameter increases progressively then proceeds to move more deeply into the shell to further expand it against the wall of the enlarged hole. Hence the slip of the anchor is controlled and the resultant load displacement curve exhibits a steady increase, thereby satisfying the criteria for load displacement behavior.

An anchor bolt assembly in accordance with the invention does not wait for a crack in the masonry to fully develop before the assembly is activated to cope with the enlarged hole. At the first sign of a developing crack, as the hole begins to enlarge and to weaken the exiting anchoring force, the load imposed on the bolt by the fastened object then proceeds to draw the trailing zone of the wedge nut mounted on the end section of the bolt into the shell to further expand it. As the cracked hole in the masonry grows larger in size, the trailing zone of the wedge nut is drawn more deeply into the shell to further expand it against the wall of the enlarging hole to maintain the anchoring force until the hole reaches its ultimate enlarged size which depends on the nature of the crack, at which point the assembly is again stable and strongly anchored in the enlarged hole.

Hence at no time is the expanded shell of the assembly disengaged from the wall of the hole and at no time is the anchoring force disabled.

While there has been shown a preferred embodiment of the invention, it is to be understood that many changes and modifications may be made therein without departing from the essential spirit of the invention.

We claim:

1. A fail-safe anchor bolt assembly installable in a hole drilled in masonry subject to cracking to fasten an object thereto, said assembly comprising a bolt turnable by a torque tool having a head and a shank extending therefrom, an expansible shell surrounding the shank, and a wedge nut threadably received on the shank and adapted when the bolt is turned to enter into and expand the shell outwardly against the wall of the hole, said wedge nut having a generally conical frustrum shape defining a leading end followed by a leading portion which merges with a compressible trailing portion terminating in a trailing end, said shape being characterized by a substantially uninterrupted transition in diameter which increases progressively from the leading end to the trailing end, said leading portion having a maximum diameter close to the diameter of the drilled hole, said compressible trailing portion having a normal maximum diameter greater than the diameter of the drilled hole whereby:

(a) when the assembly is driven into the drilled hole, the trailing portion of the wedge nut is then compressed to permit entry therein and to prevent its rotation so that as the bolt is turned by the tool, the non-rotating wedge nut advances axially on the shank to cause the leading portion to enter into and expand the shell outwardly against the wall of the hole to produce an anchoring force to fasten the object to the masonry; and (b) should the masonry thereafter develop a crack resulting in enlargement of the drilled hole, the fastened object loading the assembly will then move the trailing portion of the wedge into the shell to further expand it outwardly against the wall of the enlarged hole, this movement of the wedge nut causing a non-interrupted and continuous expansion of the shell as the wedge nut advances into the shell, thereby avoiding an uncontrolled slip of the wedge nut and maintaining the anchoring force fastening the object to the masonry.

2. An assembly as set forth in claim 1, in which the trailing portion is slotted to define spring fingers which render the wedge nut compressible.

3. An assembly as set forth in claim 1 in which the shell is formed by a cylindrical tube which is slotted at one end to define tines which are bendable to engage the wall of the hole.

4. An assembly as set forth in claim 1, in which the bolt, the shell and the wedge nut are all formed of metal.

5. An assembly as set forth in claim 4, in which the bolt and the wedge nut are formed of steel.

6. An assembly as set forth in claim 1, in which the front end of the wedge nut is bevelled to facilitate entry of the leading zone into the annular space.

7. An assembly as set forth in claim 1, in which the trailing end of the wedge nut is bevelled to facilitate entry of the compressible trailing portion into the drilled hole.

8. An assembly as set forth in claim 1, in which the geometry and dimensions of the wedge nut are such that when a crack develops in the masonry, the object loading the bolt is then displaced outwardly from the surface of the masonry to an ultimate position, and the outward movement of the object, when plotted, produces a load displacement curve which exhibits a steady increase.

9. An assembly as set forth in claim 1, in which the head of the bolt has a hexagonal form engageable by a wrench.

10. An assembly as set forth in claim 9, further including a collar of deformable material interposed between the head of the bolt and the shell mounted on the shank of the bolt, whereby when the bolt is turned to draw the fastened object tighter against the masonry, the collar is then deformed to permit this action.

11. An assembly as set forth in claim 10, in which the collar is of synthetic plastic material.

12. An assembly as set forth in claim 10, further including a washer interposed between the head and the collar.

* * * * *